Figure 1:
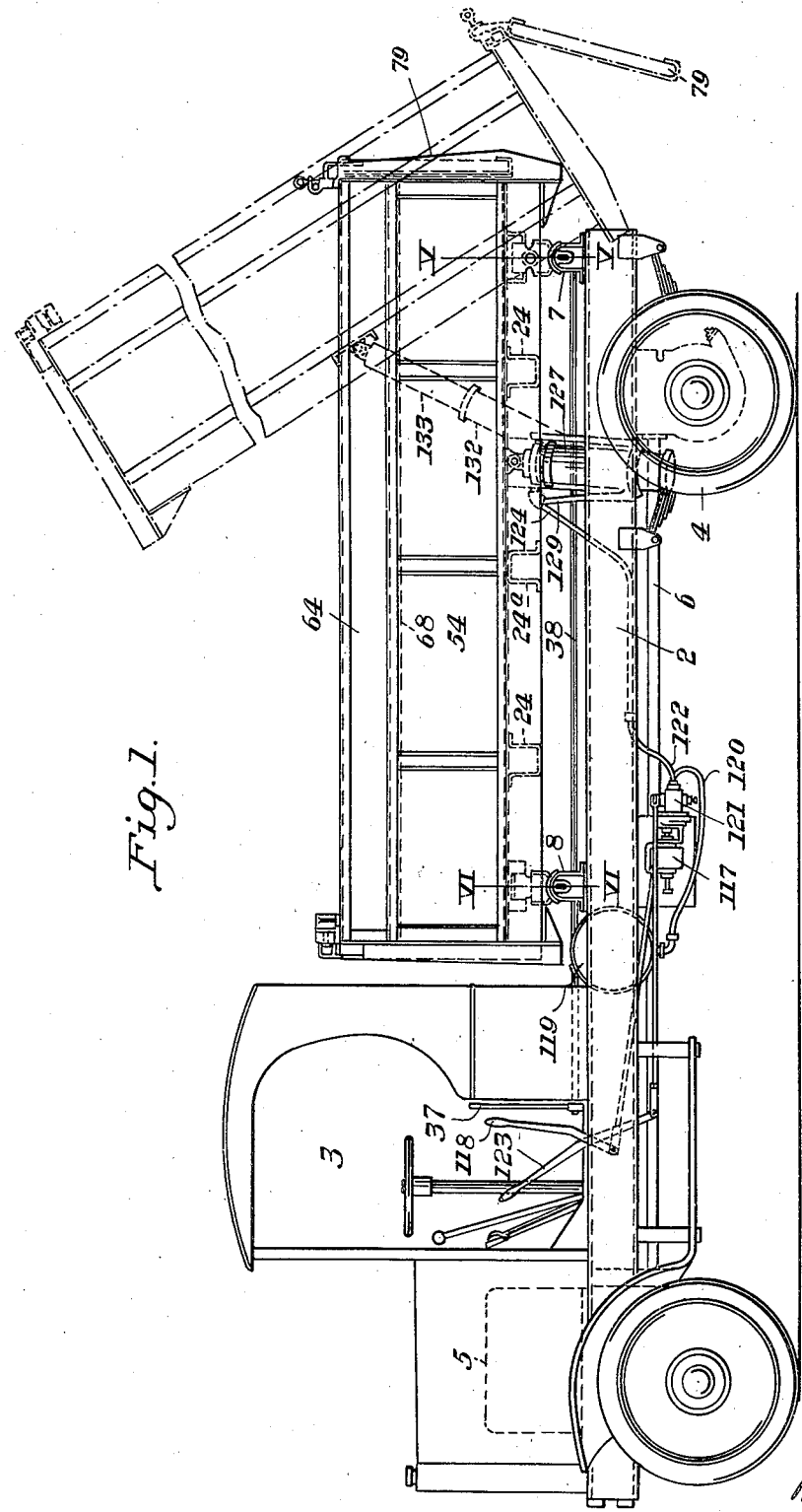

Aug. 1, 1939.   C. P. GALANOT   2,168,298
DUMP VEHICLE
Original Filed Feb. 28, 1928   11 Sheets-Sheet 1

INVENTOR
Camille P. Galanot
by his attorneys
Byrnes, Stebbins
Parmelee & Blenko

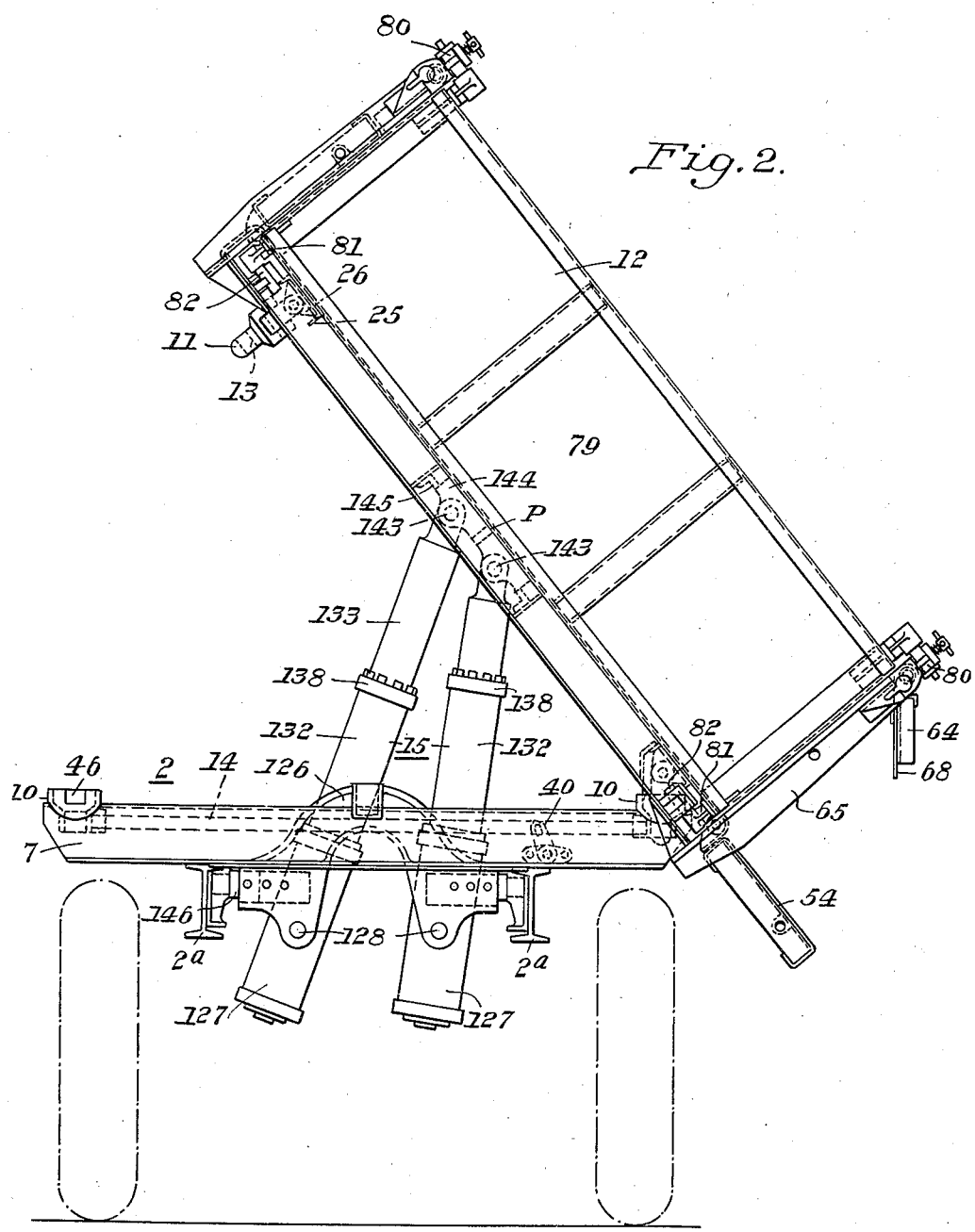

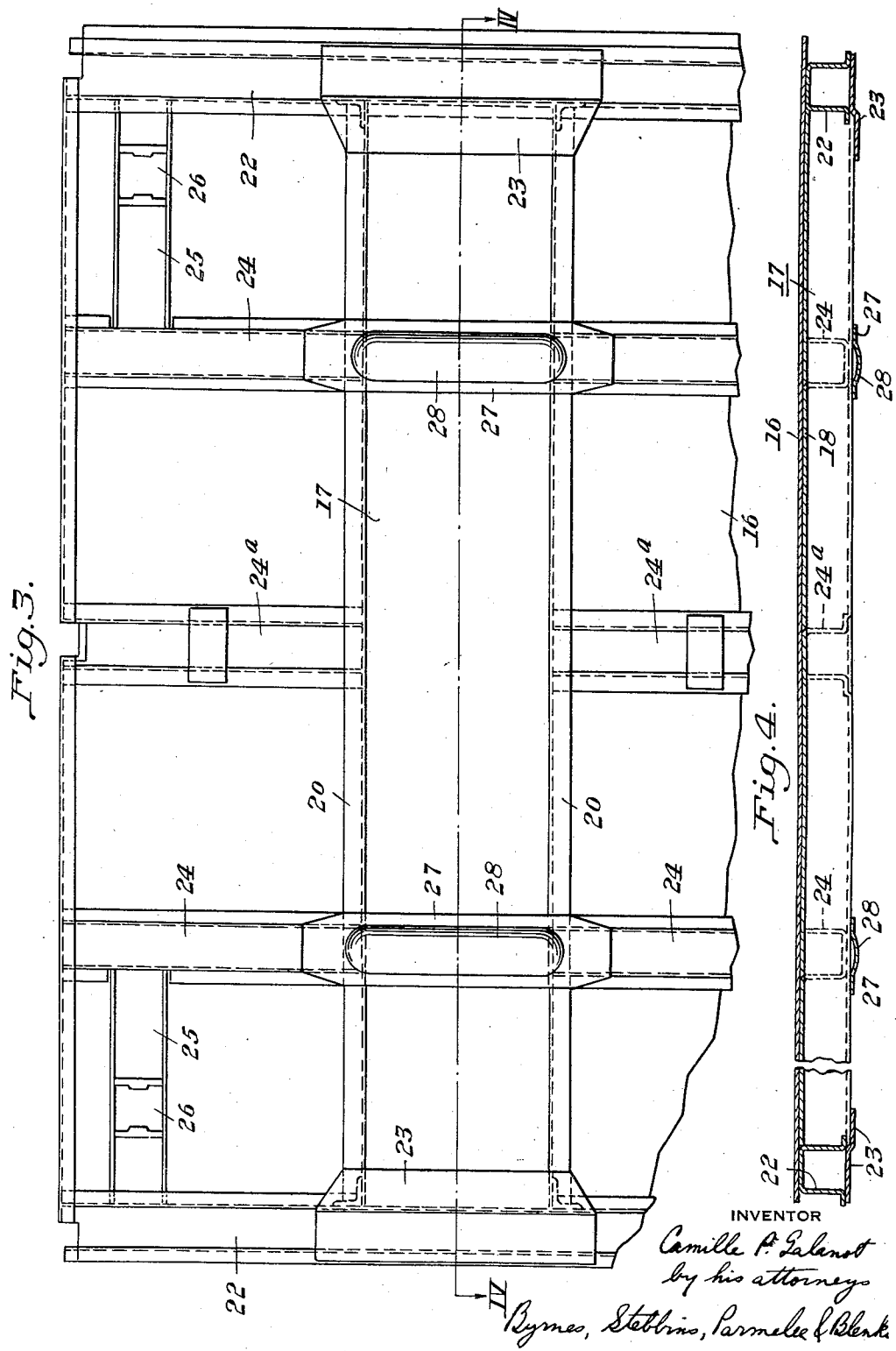

Aug. 1, 1939.   C. P. GALANOT   2,168,298
DUMP VEHICLE
Original Filed Feb. 28, 1928    11 Sheets-Sheet 4
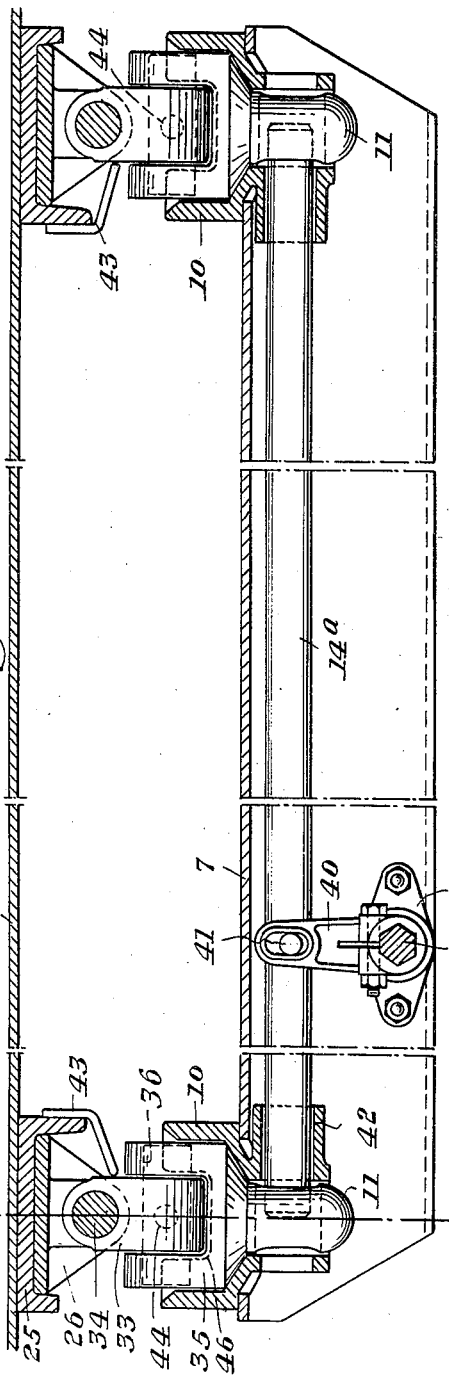
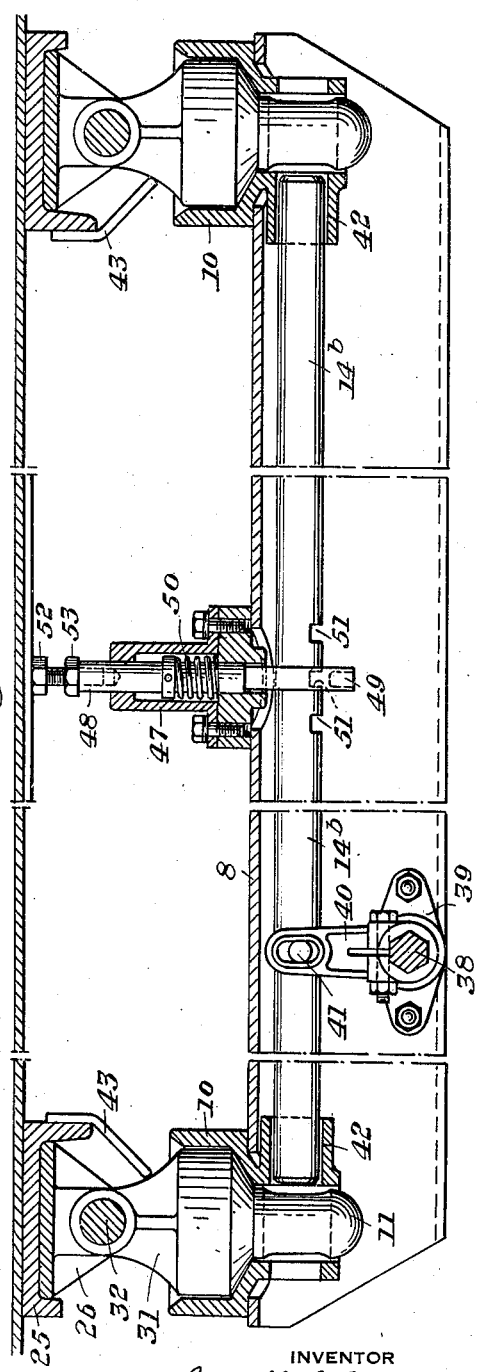
INVENTOR
Camille P. Galanot
by his attorneys
Byrnes, Stebbins, Parmelee & Blenko

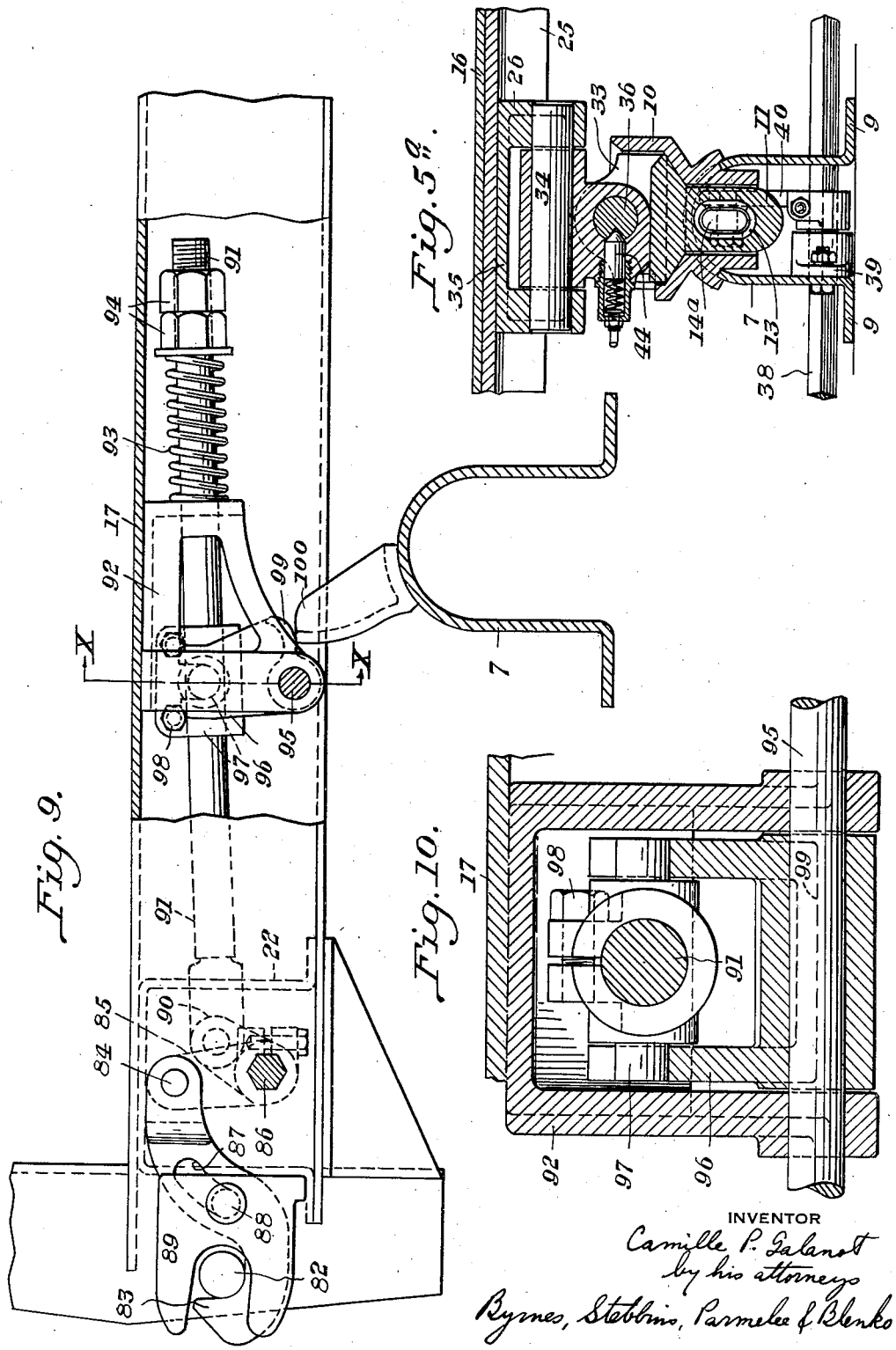

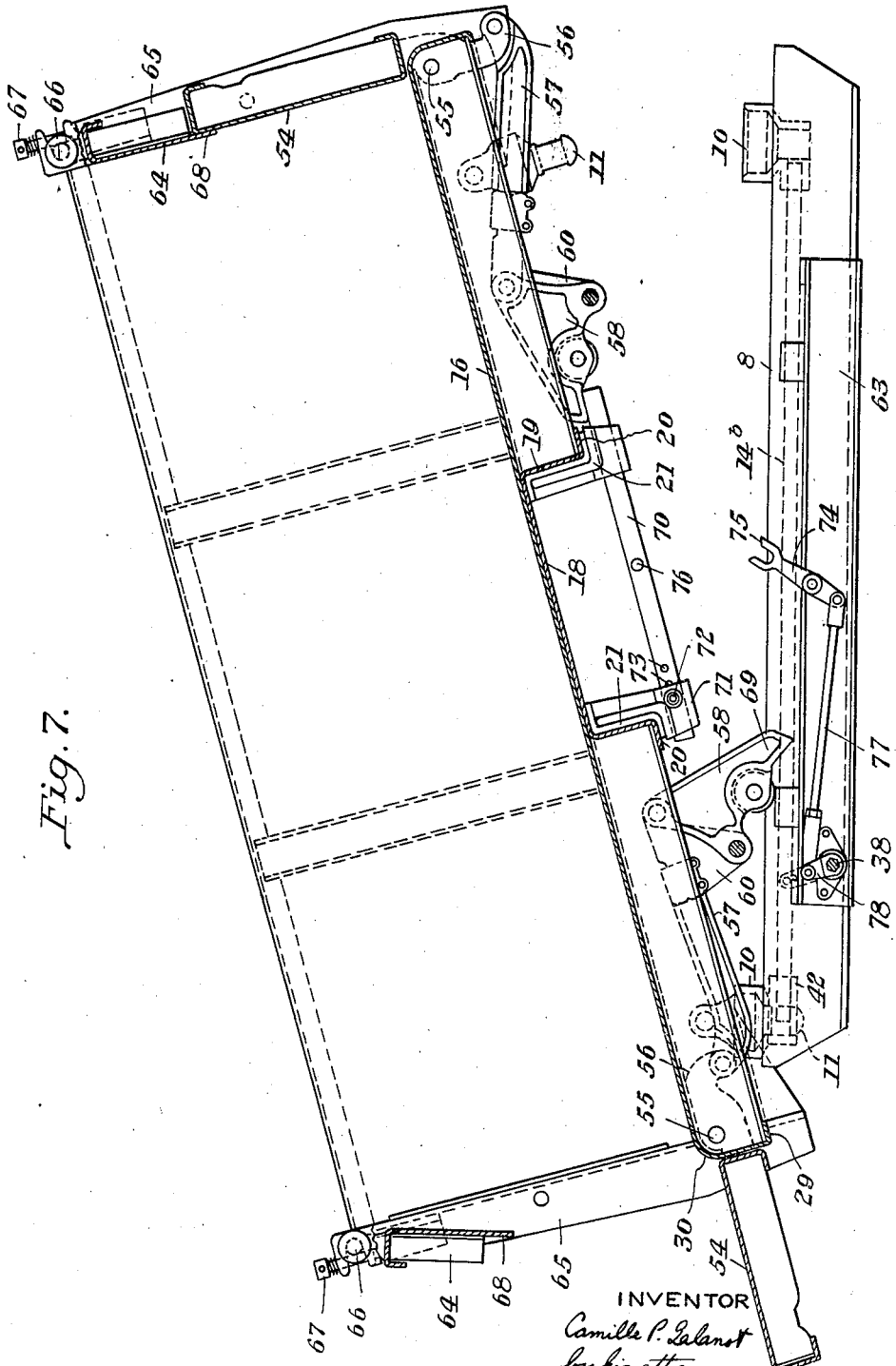

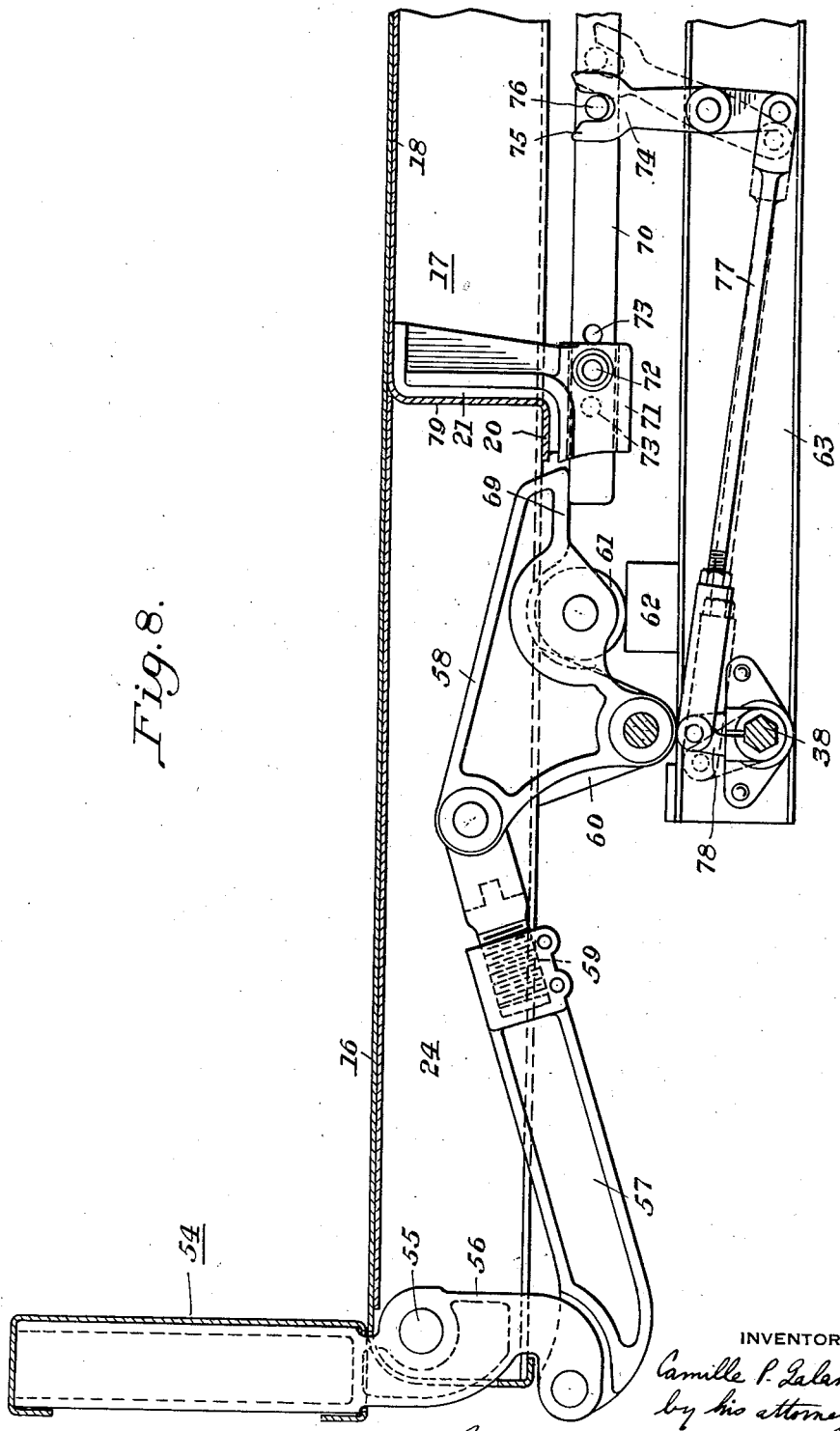

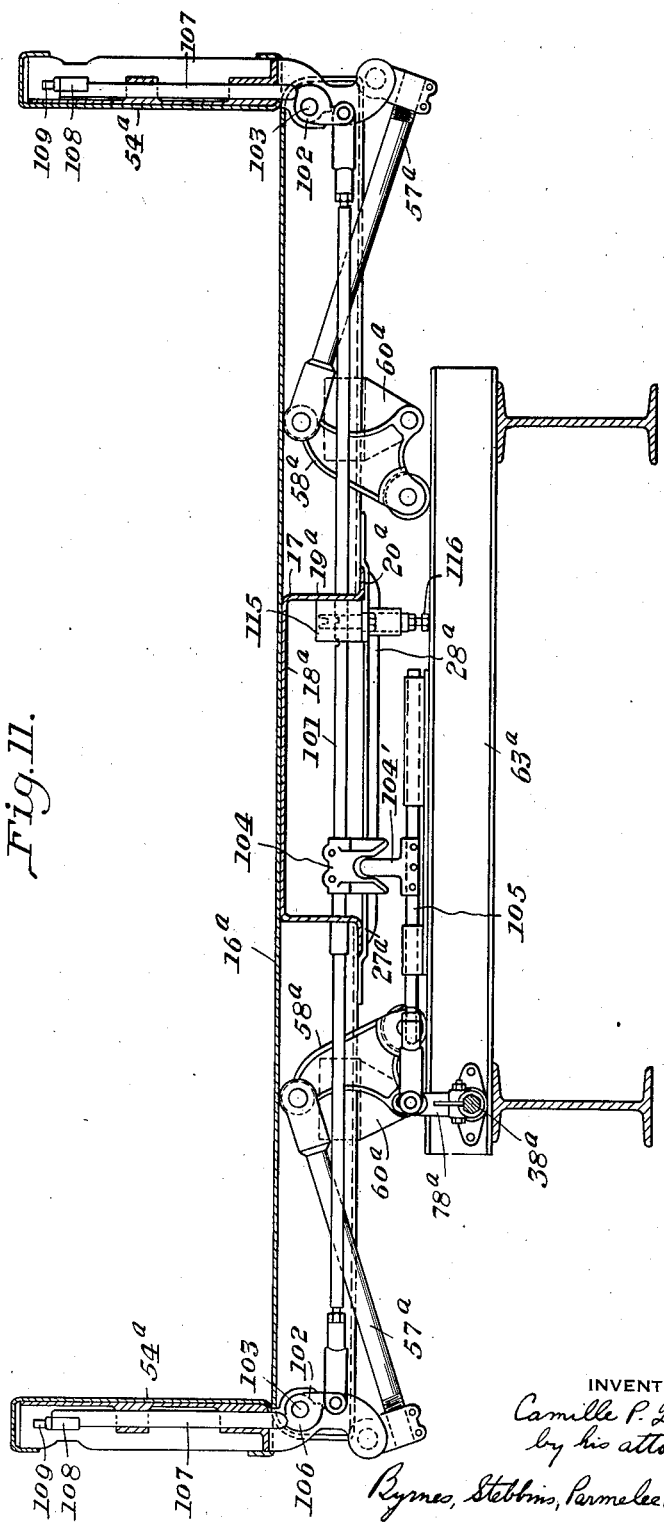

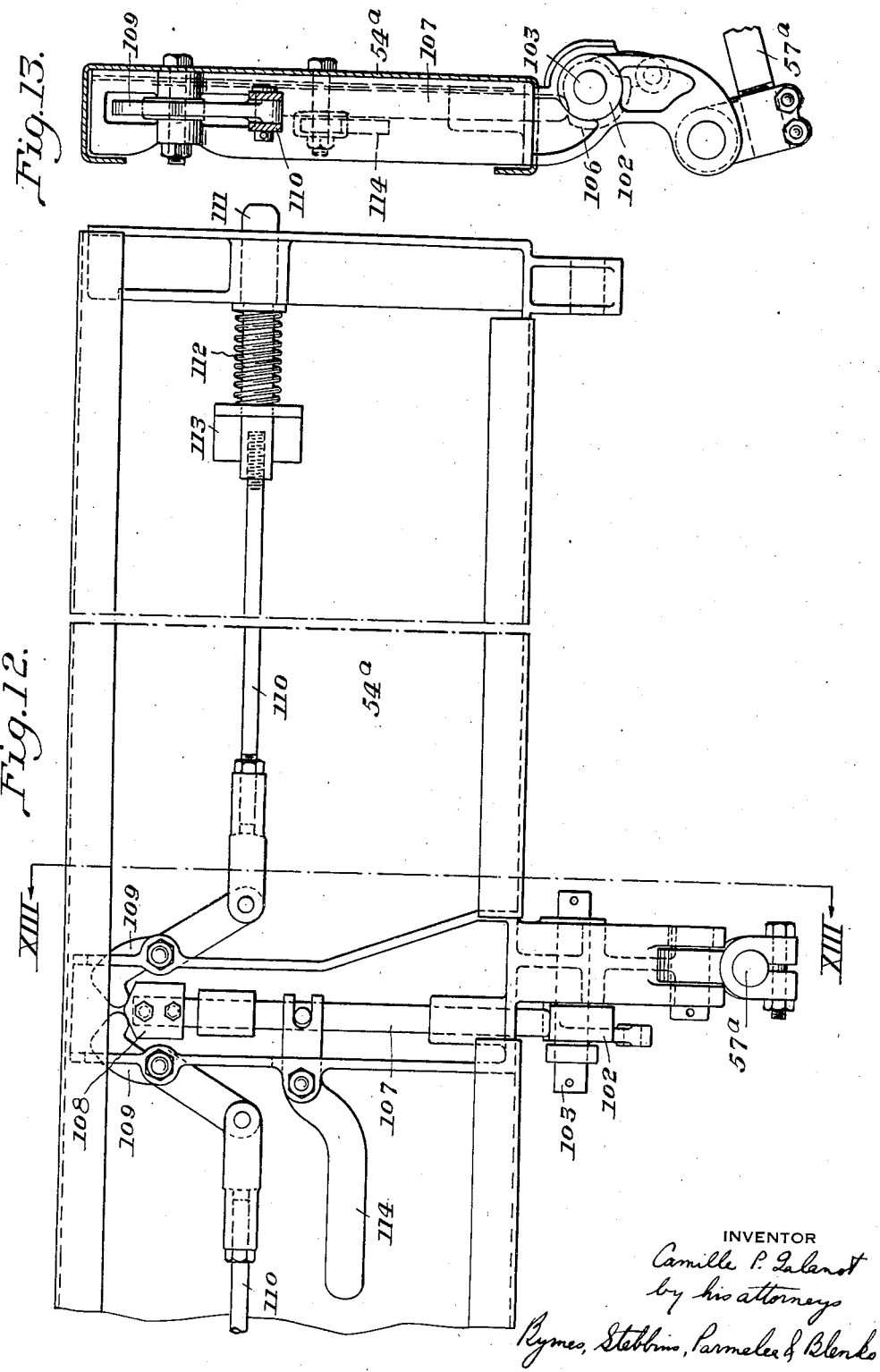

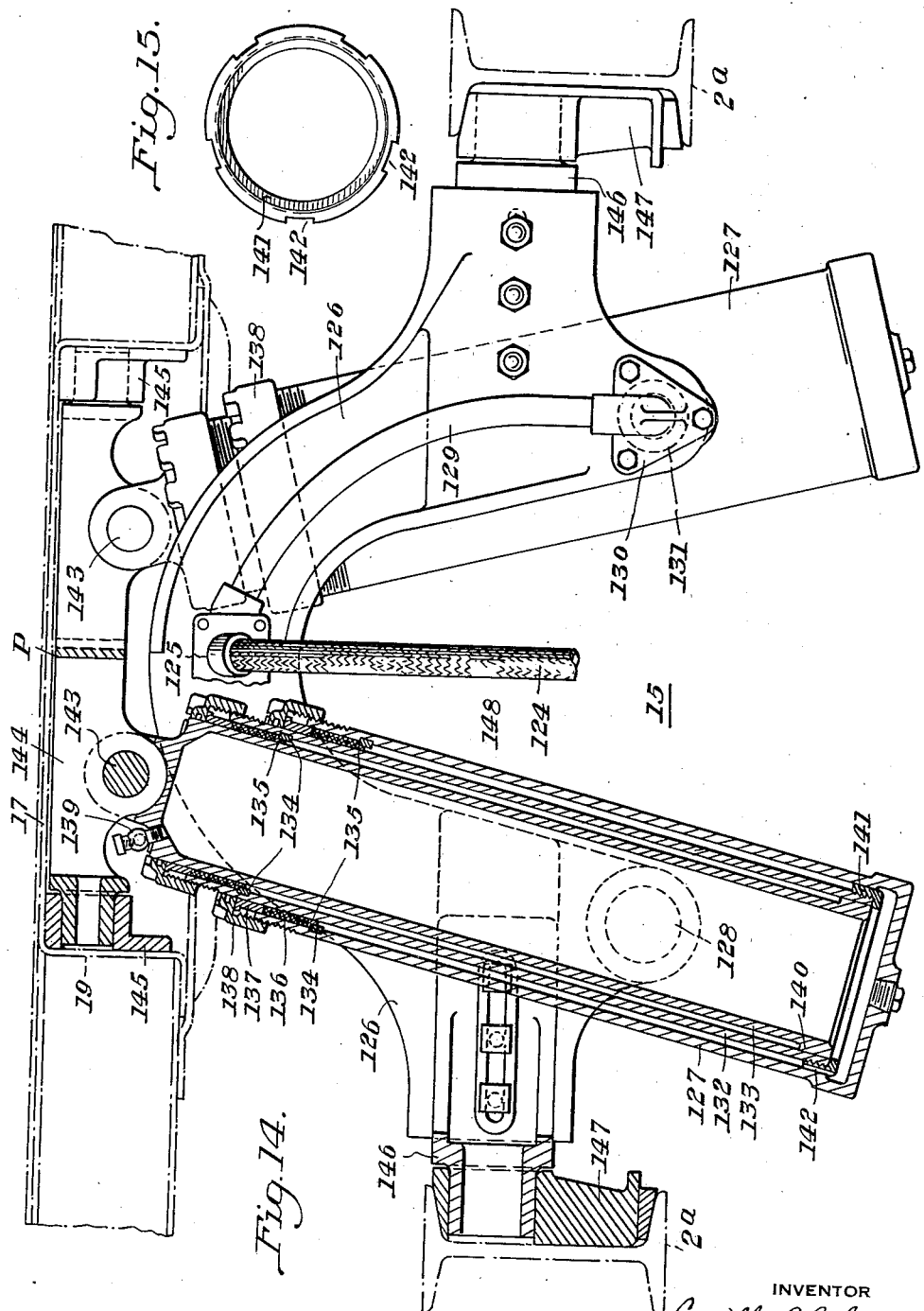

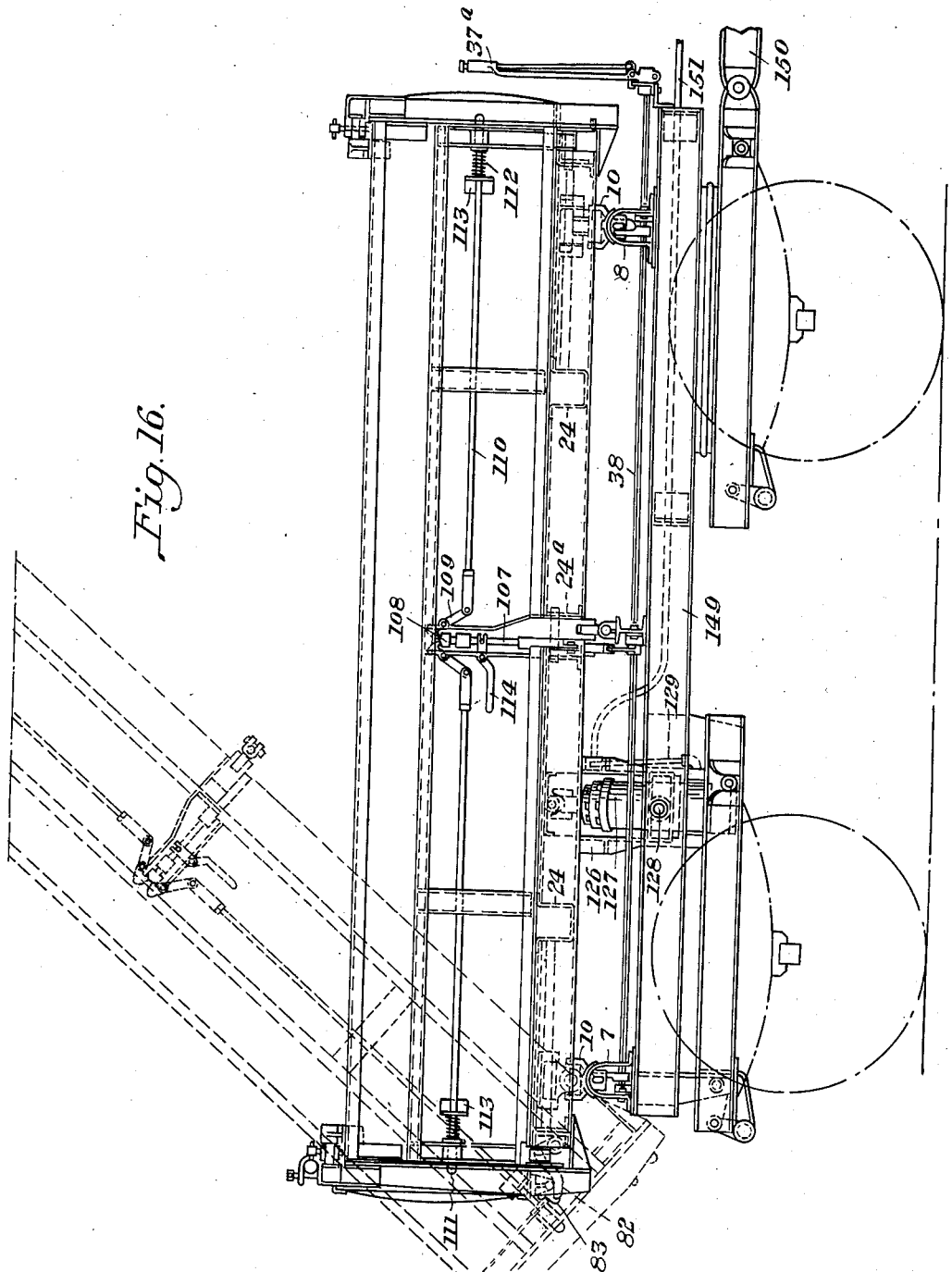

Patented Aug. 1, 1939

2,168,298

UNITED STATES PATENT OFFICE 2,168,298

DUMP VEHICLE

Camille P. Galanot, Youngstown, Ohio, assignor to The Commercial Shearing & Stamping Company, a corporation of Ohio Original application February 28, 1928, Serial No. 257,707. Divided and this application January 30, 1931, Serial No. 512,289

32 Claims. (Cl. 105—276)

This invention relates to dump vehicles, and provides an improved structure effective for dumping to either side, or to the end of the truck, as desired, although certain features of the invention are of value in dump trucks adapted for dumping only to the side or the rear.

This application is a division of my copending application, Serial No. 257,707, filed February 28, 1928 Patent Number 1,909,341 issued May 16, 1933, claiming certain features of the construction herein described.

Various forms of three-way dump trucks have heretofore been proposed, but most of them have been open to numerous objections. The mechanism for controlling the direction of dumping has been complicated, and has been of such nature as to necessitate the truck driver leaving his cab and going to the side or end of the vehicle to actuate the dumping mechanism. The supports provided for the body have not been of such character as to stand up under the severe usage to which apparatuses of this kind are subjected, and this is also true of the body constructions employed.

I provide a relatively simple structure which has proved in practice to be satisfactory from every standpoint.

I employ a dump body having a number of desirable features of construction. The floor plate of the body is preferably made in a single piece, and it is stiffened along the center by a wide "back-bone", which back-bone preferably consists of a wide strip of metal bent to generally U shape, with the flanges extending downwardly, and with the web in contact with the floor plate. This construction materially reinforces the floor plate along its central portion. In loading a truck of this kind, the central portion of the floor plate is subjected to particularly severe abuse. Rocks and boulders drop from the dipper of a steam shovel and tend to batter the floor plate in the central portion, and the wide back-bone gives it the reinforcement at such points.

Cross girders extend from the central backbone to the sides of the body and the sides of the floor plate are bent around the ends of these cross girders. The cross girders are also preferably made U shape in cross section, but with the flanges extending upwardly into engagement with the floor plate.

The dump body is tilted by means of a hoisting jack which preferably engages the body structure within the wide back-bone. I preferably employ a hydraulic jack, and at least a portion of the hoist mechanism lies within the back-bone. In vehicles of this character it is important to keep the body as close to the ground as possible. The trucks must be low enough so that they can be readily filled by an ordinary steam shovel, and, of course, the higher the load the greater is the tendency to sway and turn over when the truck is in motion. The hollow back-bone saves some six to eight inches in the height of the truck.

All of the parts constituting the body are preferably connected together by welding. Most constructions heretofore proposed have required a large number of rivets in the floor plate. This frequently interferes with the free dumping of the truck, particularly if the material therein is of a sticky nature. Moreover, unless all of the rivet heads are counter-sunk they are likely to wear away in time. Continued battering of the floor plate tends to loosen the rivets in their holes, and to pull them out of the floor plate.

The back-bone and the several girder members employed are preferably made of stampings of sheet metal of uniform thickness. These are superior to structural shapes because experience shows that it is difficult, if not impossible, to secure a permanent welded joint between a body skeleton made of structural shapes and a steel floor plate. The usual structural shapes are so proportioned that when a truck body made from them is unduly loaded, the sheet breaks the welds and pulls away from the skeleton. Stampings of sheet metal are also of value in that ample strength can be secured with a minimum of height.

As above stated, it is preferred to apply the hoisting power to the body in the general neighborhood of the back-bone. In order to distribute the hoisting force most effectively, the hoisting jack employed is connected at its upper end to a trunnion which extends between and makes connection with the flanges of the back-bone. These flanges are reinforced by Z shaped, or channel shaped, members, which members are preferably stamped from sheet metal.

In order to insure stability during travel of the vehicle, the dump body is supported at its four corners. A hinge device is connected to each corner of the body and the chassis is provided with receivers which engage portions of these hinges. The hinges preferably have downwardly extending pins which fit into cup-like receivers on the chassis. The ordinary truck chassis consists of a pair of beam members, and I provide cross beams which may be secured to these beam members. The cross beams are hollow and carry the receiving cups at their outer ends. Locking bars are arranged within the cross beams for engaging the depending pins of the hinges. The locking bars are preferably actuated by a shaft running longitudinally of the truck and terminating in an actuating handle in the truck cab. By moving the handle to one side, the locking bars are so actuated that when the hoist is put into operation the body will dump to one side. If the handle is moved to another position, it will dump to the other side, and if it is moved to a third position, it will dump to the rear.

The locking bars are preferably connected to the actuating shaft by means of levers which are slidable along the shaft, the shaft being made non-circular so that the relative angular relation of the levers cannot be changed. Dump bodies of this character must be made to fit truck chassis of different manufacture and it is important that all of the parts which make connection with the truck chassis be so adjustable that the body can be fitted to any particular chassis with a minimum of difficulty.

The cross beams which support the body may be secured to the chassis frame at different positions so that one chassis may take dump bodies of different capacity. Whenever a dump body is fitted to a particular chassis the levers which actuate the locking bars must be suitably positioned on the actuating shaft, and when the shaft is non-circular this can be done without difficulty and with the assurance that the several locking bars will be properly actuated.

A safety device is provided so that as soon as the dump body is tilted the control mechanism is locked. This prevents inadvertent shifting of the control lever, which might cause damage. When the dump body is tilted the control lever is locked and is not unlocked until the dump body has returned to its normal lowered position.

The dump body is provided with side and end doors and provision is made for automatically opening the proper door when the body is tilted. I preferably employ for this purpose a lever which is mounted on the body structure, but which is adapted to engage the chassis. When the lever is in engagement with the chassis it holds the door in closed position, but when the body is tilted so as to move the pivot point of the lever away from the chassis the proper door is free to open. Provision is made for locking the other doors during the dumping movement. The locking mechanism is preferably actuated from the non-circular shaft so that when the operator moves the control lever to a position corresponding to the desired direction of dumping the door locking mechanism is simultaneously controlled so as to permit the proper door to open.

The side doors are preferably hinged adjacent the floor plate and the lever mechanism is such that the first few degrees of tilting movement of the body is sufficient to throw the door wide open. Throughout the remainder of the dumping movement the door remains in its open position. The floor plate, being bent over the ends of the cross girders, offers no resistance at its edge to free dumping of the material in the body, and the side door is so arranged that when it is in its open position it lies slightly below the plane of the floor plate and acts as a spill plate over which the material travels. This throws the dumped material over and clear of the truck wheels.

The hoisting jack employed is preferably of the hydraulic type. When the body is to be used on a dump truck two hoisting cylinders are preferably employed, these cylinders lying one to either side of the center line of the truck so as to provide room for the propeller shaft and torque tube through which power is delivered from the motor to the rear axle. In other types of vehicles, such as trailers or chain drive trucks, it may be desirable to employ only a single hoist cylinder. The hoist cylinders are preferably pivotally mounted on a trunnion extending between the frame members of the chassis. The trunnion is made adjustable in width so that it may be fitted to truck frames of different widths. The trunnion is preferably in the form of a yoke having a recess in its bottom face so as to provide ample room for the propeller shaft or torque tube.

Nested cylinders are preferably employed. These cylinders are open bottomed so that they are filled with fluid when the jack is extended. With this arrangement, the extended jack is more rigid than would otherwise be the case. The fluid connection is preferably through the pivotal mounting of the cylinders so as to eliminate as far as possible the use of flexible connections.

The cylinders are preferably pivoted below the axis of the trunnion yoke, as this reduces the amount of side movement of the bottom portions of the cylinders on side dumping, and does away with interference of the cylinders with the propeller shaft, brake rods, etc. Moreover, with this arrangement there is less angular movement of the cylinders on sidewise dumping, and the tendency of the nested pistons to bind is correspondingly reduced.

The cylinders are preferably arranged in non-parallel relationship, they being relatively wide apart at the bottom and converged at the upper end. This gives more room for the propeller shaft, and also divides the load between the cylinders more uniformly on sidewise dumping.

The tilting movement of the body in any direction is limited by the amount of movement provided in the hydraulic jacks. In order to provide substantially equal amounts of tilting movement about any of the axes around which the body may tilt, the jack is preferably so positioned that its point of power application to the body is spaced substantially equal distances from the several axes.

In the accompanying drawings illustrating the present preferred embodiment of my invention, and certain modifications thereof:

Figure 1 is a side elevation of a truck having my improved dump body thereon, the dotted lines indicating the position of the body when it is tilted to the rear, Figure 2 is a rear end elevation showing the body tilted to one side, Figure 3 is an inverted plan view partly broken away, showing the bottom of the body, Figure 4 is a longitudinal section partly broken away, taken on the line IV—IV of Figure 3, Figure 5 is a transverse section taken on the line V—V of Figure 1, and showing the hinges and locking bar employed at the rear of the truck, Figure 5a is a section taken on the line Va—Va of Figure 5, Figure 6 is a similar view taken on the line VI—VI of Figure 1 and showing the hinge members and the locking bar employed at the front of the truck, Figure 7 is a transverse section taken on the same plane as the section of Figure 6, but showing the dump body and the chassis, and illustrating the quick opening action of the side doors, Figure 8 is a view to enlarged scale of a portion of Figure 7, showing the side door in closed position, Figure 9 is a longitudinal vertical section showing the locking mechanism for the rear door, Figure 10 is a transverse section taken on the line X—X of Figure 9, Figure 11 is a transverse section corresponding generally to Figure 7, but showing a modified form of lock for the side doors, Figure 12 is a side elevation partly broken away of a side door employing the modified locking mechanism illustrated in Figure 11, Figure 13 is a transverse section taken on the line XIII—XIII of Figure 12, Figure 14 is a transverse view showing the hoisting jacks and the trunnion yoke on which they are mounted, the view being partly broken away to show one of the jacks in cross section, Figure 15 is a bottom view of one of the pistons employed, and Figure 16 is a side elevation of a trailer employing the door locking mechanism illustrated in Figures 11 to 13 inclusive.

Figure 1 shows a truck having frame members 2, a driver's cab 3, and rear wheels 4 driven from the engine 5 through a propeller shaft 6. The frame 2 consists of a pair of parallel I-beams 2a, and these frame members have cross beams 7 and 8 secured thereto toward the rear and the front of the truck, respectively. Each of the cross beams 7 and 8 is formed of a metal stamping which is generally of inverted U shape, but is provided with outwardly extending flanges 9 by which the cross beams are firmly secured to the frame members 2a. Each of the cross beams 7 and 8 is provided with a cup 10 adjacent its outer end, and these cup members receive the pins 11 of hinges secured to the dump body 12. When the dump body is in its normal lowered position it is supported at its four corners on the hinge members.

The pins of the hinge members have openings 13 formed therethrough and locking bars 14 are provided to selectively engage different hinge members, as hereinafter described, so as to control the direction of dumping. The body is tiltable about any of three axes, as desired, by means of a hydraulic jack, indicated generally by the reference character 15.

*Body construction*

See particularly Figures 2, 3, 4, and 7.

The body comprises a floor sheet 16 overlying a central U shaped back-bone 17 whose web 18 is in contact with the floor sheet 16 and whose flanges 19 extend downwardly. The edges 20 of the flanges 19 are turned outwardly, as best shown in Figure 7. The flanges of the back-bone are reinforced by Z bars 21 which are formed from sheet metal. At each end of the back-bone there is provided a cross girder 22 which is U shaped in cross section and has its flanges directed downwardly, as best illustrated in Figure 4. The back-bone 17 is connected to the cross girders 22 by means of gusset plates 23.

Intermediate the ends of the dump body there are provided sidewise extending girders 24, the inner ends of which girders fit between the floor plate 16 and the flanges 20 of the back-bone. These intermediate girders are U shaped in cross section, and like the other girders, are stamped from sheet metal. Some of them have their flanges directed upwardly and some have their flanges directed downwardly. The entire body is welded together, and the girders whose flanges are directed upwardly cooperate with the floor sheet to form hollow box-like girders. Those intermediate cross girders whose flanges are directed downwardly are indicated at 24a, and are arranged so as to accommodate door locking mechanism as hereinafter described.

Adjacent each of its four corners the body is provided on its under side with channel-like strips 25 adapted to accommodate castings 26 (Figure 2) in which the hinges for the body are mounted. The castings 26 may be moved to different positions along the channels so as to accommodate the body to different trucks.

Since the body is supported in its four corners it is necessary to provide gusset plates 27 extending across the open face of the back-bone. These plates are welded to the intermediate cross girders 24, as shown in Figure 3. They are in tension when the truck body is in its lowered position and is loaded. When the hoisting power is applied by means of the jack 15 the body is no longer supported at its four corners but only along the axis about which it tilts, and the load conditions therefore change. The gusset plates 27 are thrown into compression and they are therefore provided with a welt or bulge 28 extending entirely across the back-bone so as to make them more adapted to necessary compression.

The edges of the floor sheet 16 are bent around the ends of the cross girders, as indicated at 29 and are rounded off at the corners as indicated at 30.

By reason of the fact that the entire body structure is welded, there are no rivets to tear loose, or to interfere with the clearing of material from the body. Great strength is secured by a welded assembly and it is possible to use metal of lighter gages than could be used if it were necessary to employ rivets, so that the weight of the structure is materially reduced.

*Locking and control mechanism*

See particularly Figures 1, 5, 6 and 7.

Figures 5 and 6 show respectively the rear and front hinges on which the body is mounted. The front hinges comprise the castings 26 and hinge blocks 31 connected thereto by hinge pins 32. The bottom portions of the hinge blocks 31 form the pins 11 which fit into the cups or receivers 10. The hinges at the rear of the body also employ the castings 26. Blocks 33 are pivoted to the castings 26 at 34 and hinge blocks 35 are in turn hinged to the blocks 33 at 36. This double hinge arrangement is necessary at the rear of the body so that either side or end dumping can be effected. When the body is dumped to the side it is rotated around the hinge pins 32 and 34, and when it is dumped to the rear it is rotated around the pins 36.

The direction of dumping is controlled by the locking bars. The rear locking bar is indicated at 14a in Figure 5, and the front locking bar is indicated at 14b in Figure 6. The locking bar 14b is of such length that when it is in its intermediate position it lies clear of the pins 11 of both the front hinges, while the locking bar 14a is made of such length that when it is in its intermediate position it extends substantially half way through the openings in the pins 11 of each of the rear hinges. If the locking bars maintained in the position shown in Figures 5 and 6, and power is applied by the hoist 15, the front hinges are free to move out of their cups 10 while the rear hinges are locked in their cups. Therefore the body will rotate about the rear hinges for end dumping.

The position of the locking bars 14a and 14b is controlled by a lever 37 in the cab 3. This lever is mounted on a hexagonal shaft 38. The shaft is carried in bearing blocks 39 secured to the cross beams 7 and 8, and within each of the cross beams 7 and 8 it carries an actuating lever 40. Each actuating lever is slotted to receive a cross pin 41 extending through a locking bar 14a or 14b. When the control lever 37 is in its middle position, the locking bars 14a and 14b occupy the position of Figures 5 and 6. When the control lever is moved to the left the locking bars are also moved to the left. This movement causes the locking bar 14b to engage the left hand front hinge. The locking bar 14a slides further into the recess in the pin of the left hand rear hinge and slides out of engagement with the right hand rear hinge. Therefore when the control lever 37 is moved to the left it effects locking of the hinges on the left hand side in their cups, and leaves the hinges on the right hand side free. With the lever in its left hand position hoisting power applied through the jack 15 is effective for dumping the truck to the left. If the lever is moved to the right, the hinges at the right hand side are locked in their cups and the hinges on the left hand side are left free so that right hand dumping is effected upon actuation of the hoisting jack 15. This permits of selective side or end dumping without the operator having to leave the cab of the truck. The provision of the non-circular shaft 38 insures that the levers 40 for both the front and rear locking bars will occupy the desired relative position, and thus prevents the levers from getting out of adjustment relative to one another.

There is no necessity for making any adjustments during assembly, as the locking bars are automatically properly positioned. With this arrangement the levers 40 can be adjusted to any position along the shaft 38 as may be dictated by the size of the truck to which the dump body is applied. The cups 10 are welded in openings formed in the cross beams 7 and 8 and are provided with bearing portions 42 through which the ends of the locking bars slide. This insures free working of the locking bars even though the cross girders become warped or twisted under excessive loads, such as might be occasioned by non-uniform loading of the truck, or by one of the truck wheels being in a rut or on top of a rock.

As shown in Figure 2 the lower portions of the hinges maintain their position of substantial perpendicularity relative to the floor of the body, even though they are raised out of the cups 10. This is accomplished by means of brackets 43 which engage the hinge blocks 31 and 33. The hinge blocks 33 are maintained in the desired position relative to the hinge blocks 35, when a rear hinge is out of engagement with its cup, by means of a detent 44 (Figure 5a). This insures that the pins 11 will always find their way back to the cups 10 when the body is lowered. The pins are rounded at their bottom ends and the supporting faces 45 of the cups are inclined so that even if the hinge blocks do get slightly out of position they will be properly centered as soon as they engage the cups. The cups are open-bottomed to ensure that they will not fill with dirt.

It will be noted from Figure 5 that the hinge pins 36 lie well down in the rear cups and in order to avoid interference between the hinge blocks 33 and the cups upon end dumping, the rear cups are slotted as shown at 46 (Figure 2). As above stated, the cross beam 7 is rounded off at the top and this is of value in end dumping, as it permits of tilting the body to a very great angle without interference between the body structure and the beam 7.

In order to insure that the control lever shall not be actuated except when the body is in its lowered position, a safety device, illustrated in Figure 6, is provided. This safety device consists of a housing 47 mounted on the cross beam 8 and carrying a plunger 48. The bottom end of the plunger is in the form of a yoke which embraces the locking bar 14 and is provided with a cross arm 49. The plunger 48 is normally urged upwardly by a compression spring 50 so as to bring the cross arm 49 into engagement with the locking bar 14b. The locking bar 14b is provided with three notches 51. When the body is in its lowered position, it engages the head of a bolt 52 threaded into the top of the plunger 48 and depresses the plunger so that the arm 49 is out of engagement with the locking bar 14b. This permits of free actuation of the control lever 37. However, it requires only a few degrees of tilting movement of the body in any direction to permit the plunger 48 to rise a sufficient distance to bring the cross arm 49 into engagement with the locking bar 14b. The cross slots 51 are so positioned that one of them lies immediately over the cross arm 49 in any of the three adjusted positions of the control lever 37. The cross arm 49 is forced into one of the slots 51 when the plunger 48 rises so that it is impossible to actuate the control lever until the body has been returned to its lowered position. The screw 52 is provided with an adjusting nut 53 by which the amount of movement required to actuate the locking device may be adjusted, as desired.

*Side door actuating and locking mechanism*

See particularly Figures 7 and 8.

The side doors of the body are indicated generally by the reference character 54. The side doors are pivoted at 55 about an axis lying a short distance below the plane of the floor sheet 16. Each side door is provided with two downwardly extending arms 56, one near each end of the door. Each arm 56 is connected through a link 57 to a bell crank 58. The link 57 is made in two parts so as to provide a screw adjustment 59 whereby its length may be varied. The bell crank lever 58 is pivoted on a bracket 60 secured to the under side of one of the intermediate cross girders 24. Each bell crank lever is provided with a follower roller 61 adapted to engage a block 62 carried by a cross beam 63. When the body is in its lowered position, as illustrated in Figure 8, the pressure of the block 62 on the roller 61 holds the door 54 in its closed position. When the body is tilted to the side, as illustrated in Figure 7, the door on the lower side of the body tends to fly open and the movement is resisted only by the links 57 which act through the bell cranks 58 to keep the follower rollers 61 in engagement with their blocks 62. The linkage shown in Figures 7 and 8 is designed to permit of full opening of the door in approximately 15 degrees of tilting movement of the body. The opening movement of the door is limited by engagement thereof with the downwardly extending side portion of the floor sheet 16. When the side door is at its opened position, it lies somewhat below the plane of the floor sheet and forms a spill plate which throws dumped material clear of the truck wheels.

When the body is lowered from its tilted position, the door remains open until approximately the last 15 degrees of lowering movement, when the upper rollers 61 engage the blocks 62 and rotate the bell crank levers 58 so as to put the links 57 in compression and rotate the door back to its closed position.

Auxiliary doors 64 are provided, these being pivoted to the upright members 65 of the truck body at 66. The upright members 65 are bifurcated to receive the pivots 66, which pivots are held in place by locking pins 67 so that the auxiliary doors may be easily removed, if desired.

The auxiliary doors 64 are arranged to swing so that they will not interfere with the free dumping of material in the truck. Auxiliary doors are provided so that the main side doors 54 are only of sufficient width to insure that material will be thrown clear of the truck wheels. If it were attempted to make the main doors 54 wider their outer edges would be too close to the ground when the body is in full tilted position, and might not clear the dumped material. The auxiliary doors 64 are provided with downwardly extending portions 68 which are engaged by the side doors so as to hold them in place when the body is in locked position.

It is desirable to lock the door on the side opposite that to which dumping is to be effected, as otherwise it would open during the dumping movement and might permit freely flowing material, such as sand or crushed stone, to run out. Each bell crank lever 58 is provided with a horn 69 by which this locking is effected. A locking bar 70 is slidably mounted in brackets 71 secured to the back-bone 17, one of these brackets being provided with a detent 72 adapted to engage depressions 73 in a side of the locking bar and hold it in any one of three positions. When the locking bar 70 is in its middle position it engages the horn 69 on each side of the body. When it is moved to the right the bell crank lever on the left hand side is free. When it is moved to the left, the bell crank lever on the right hand side is free.

Movement of the locking bar 70 is accomplished through a lever 74 having a yoke 75 engaging a cross pin 76 in the locking bar 70. The lever 74 is pivoted to the cross beam 63 and is connected through a link 77 to a lever 78 on the shaft 38.

When the control lever 37 is moved to the left so as to effect sidewise dumping to the left of the truck, the locking bar 70 is moved to the right to free the bell crank lever 58 on the left hand side, thus permitting the left hand door to open, but holding the right hand door locked. When the control lever 37 is moved to the right, the right hand door is released and the left hand door is maintained locked.

Rear door locking mechanism

See particularly Figures 1, 9 and 10.

The rear door 79 is pivoted to the uprights 65 of the body at 80. At each of its bottom corners the door 79 is provided with a bracket 81 (Figure 2) having a pin 82 thru which locking of the door is effected. When the door is in closed position the pins 82 are engaged by hooks 83. The hooks are pivotally connected at 84 to levers 85 on a hexagonal cross shaft 86. The hooks have curved slots 87 formed therein and pins 88 lie in these slots. The pins 88 are carried by brackets 89 mounted on the rear cross girder 22 of the body. The shaft 86 carries a lever 90 to which a slide bar 91 is connected. The slide bar extends through a bracket 92 secured to the web of the back-bone 17. The outer end of the slide rod 91 carries a compression spring 93, one end of which is engaged by the bracket 92 and the other end of which is engaged by adjustable nuts 94 on the slide rod 91. The spring 93 is in compression and always tends to rotate the shaft 86 clockwise, as illustrated in Figure 9, so as to hold the hooks 83 in the position of Figure 9, and thus keep the end door 79 locked.

The bracket 92 carries a pivot pin 95 on which is mounted a yoked lever 96. The lever 96 engages a trunnion block 97 which is clamped to the slide rod 91 by bolts 98.

A cam face 99 is formed on one side of the yoked lever 96, and a horn 100 is mounted on the cross girder 7. When the body is tilted to the rear, the cam surface 99 moves into engagement with the horn 100, thus effecting rotation of the yoked lever 96 and causing the slide rod 91 to move to the left, as viewed in Figure 9, against the force of compression of the spring 93. Upon this movement the shaft 86 is rotated counter-clockwise, thus causing the hooks 83 to slide outwardly. At the same time they are moved downwardly by reason of the fact that the slots 87 are curved. This movement releases the pins 82 from the hooks 83 and permits the end door 79 to swing outwardly. When the body is lowered, the rear door swings back by gravity into such position that the pins 82 may be engaged by the hooks 83, and upon continued lowering movement the cam face 99 is gradually freed of the engagement of the horn 100 so that the hooks 83 are returned to their normal position and lock the end door in closed position.

Modified form of side door lock

See particularly Figures 11, 12 and 13.

In the form of side door lock illustrated in Figures 11 to 13 inclusive, the side doors themselves carry locking bolts which engage the upright members of the dump body. In these drawings, parts corresponding to similar parts previously described have been given the same reference character with an *a* suffixed thereto.

The opening and closing of the side doors 54a is controlled through links 57a by bell crank levers 58a, but instead of these bell crank levers being engaged by a locking bar, the locking bar 101 extends between and is connected to cams 102, rotatable about the hinge pins 103 of the side doors 54a. The locking bar 101 carries a yoke 104 which is engaged by a finger 104' on a slide 105. The slide 105 is connected to an actuating lever 78a on the shaft 38a.

When the shaft 38a is rotated by the control lever, the cams 102 are correspondingly rotated. The cams are provided with high portions 106 so arranged that when the locking bar 101 is moved in one direction or the other, one or the other of the cams 106 is effective for raising a slide bar 107 mounted in the door 54a. The slide bar 107 is provided with a head 108 which is engaged by levers 109. These levers are connected through pull rods 110 to bolts 111 projecting beyond the ends of the side gates. The bolts 111 are normally urged outwardly by springs 112 lying between the bolts proper, and brackets 113 secured to the sides of the side gates. When the slide 107 is raised, the levers 109 are actuated to draw the bolts 111 inwardly and free the door. A hand lever 114 is provided so that the door may be opened manually, if desired.

It is necessary to hold the locking bar 101 in the position to which it is adjusted by movement of the finger 104', because the pressure of the slide bar 107 on the cam 102 is sufficiently great that when the side door is permitted to fold outwardly it tends to shift the position of the locking bar 101. If the locking bar 101 should happen to shift, the yoke 104 might not properly engage the finger 104' when the body is again lowered. In order to prevent this improper movement of the bar 101 a locking device 115 is provided. This locking device is of the same general character as that illustrated in Figures 6 and 7, but it is carried by the back-bone 17, and its plunger 116 is directed downwardly so as to bear against the cross beam 63a. The bar 101 is provided with three notches, and the yoke of the locking device 115 engages one of these notches as soon as the body has been tilted a few degrees.

It may be found desirable in building bodies according to the present invention to provide sufficient lost motion in the linkage for operating and locking the gates, to permit the side gates to open slightly when dumping to the rear. Experience shows that this feature is of advantage when handling sticky materials, such as wet sand or the like, since it tends to start the dumping of the load which might be delayed if the side gates remain fully closed and thereby exert their full frictional effect on the contents of the body.

Hoisting mechanism

See particularly Figures 1, 2, 14 and 15.

The power for actuating the hydraulic hoist 15 is supplied by the engine 5 of the truck. A power take-off mechanism, indicated generally at 117, is mounted on the side of the transmission and is arranged to make a gear connection therewith, the connection being controlled by a lever 118 in the cam 3. Oil is carried in a reservoir 119 and is supplied to the hydraulic jacks through a conduit 120 leading to a pump 121 which is driven from the power take-off 117. A conduit 122 leads from the pump 121 to the hydraulic jacks, and the flow of oil is controlled by a valve operating lever 123 in the cab. This part of the mechanism may be of any desired construction, for example, that described in United States patent to George W. Berry, 1,392,107, dated September 27, 1921, or in my copending application Serial No. 229,564, filed October 29, 1927.

The conduit 122 terminates in a piece of flexible hose 124 and the hose leads to a branch fitting 125 carried on a yoke 126. The yoke 126 carries two hydraulic cylinders 127, the cylinders having trunnion mountings 128. One trunnion of each cylinder is hollow, and oil from the branch fitting 125 may pass therethrough by way of a conduit 129 and a T fitting 130. The hollow trunnion is packed, as indicated at 131.

The cylinders 127 are made of a single piece of wrought metal, they being in the form of hollow forgings. This does away with any danger of leakage or breaking of the cylinders under the high pressures to which they are subjected in service. Each cylinder 127 contains nested pistons 132 and 133. Packing glands are provided between each cylinder 127 and its piston 132, and between the piston 132 and the piston 133. Each packing consists of a snap ring 134 fitting into a groove and a solid metal ring 135 resting on the snap ring. Packing 136 is placed above the solid ring and is compressed by a gland 137. The gland is in turn compressed by a threaded ring 138.

Each piston 133 is provided with a check valve 139. When filling the system with oil the ball of the check valve may be depressed by hand until the cylinders are emptied of air, after which the valve automatically closes.

It will be noted that the pistons 132 and 133 are open at their bottom ends so that they are filled with oil. This arrangement makes a much more rigid column when the pistons are extended, their condition at that time being roughly comparable to a flexible hose under high internal pressure. The pistons are guided at their upper ends by the glands 137. The bottom end of the piston 133 is provided with a flange 140 which makes a sliding fit with the inner surface of the piston 132. This flange also engages the snap ring 134 and limits the amount of relative movement between the pistons 132 and 133. The piston 132 is provided at its bottom end with a threaded ring 141 having slots 142 therein. These slots are necessary because the oil is supplied to the cylinders through the hollow trunnion, and when the pistons are in the retracted position shown in Figure 14, it is necessary for the oil to travel between the wall of the cylinders 127 and the piston 132 to reach the bottom of the cylinders.

The pistons are provided with sufficient clearance at the bottom so that when they are in retracted position, deflection of the body under load will not cause the bottom ends of the pistons to strike the bottom of the cylinders.

The pistons 133 are connected through pins 143 to a trunnion 144. The trunnion is mounted in blocks 145 secured to the flanges 19 of the backbone.

The yoke 126 is provided with adjustable trunnion portions 146 mounted in blocks 147 carried by the chassis members 2a. The trunnion members 146 are made adjustable so that the hoist mechanism can be fitted into chassis of various widths. It will be noted from Figure 14 that the cylinders converge toward their upper ends. This is effective for more uniformly dividing the between the two cylinders on sidewise dumping. The trunnions are located well toward the bottom of the cylinders so that the degree of sidewise movement of the bottom ends of the cylinders on sidewise dumping is reduced to a minimum. This eliminates possible interference with the propeller shaft, brake rods, etc. The yoke 126 is recessed, as indicated at 148, so as to provide ample room for the propeller shaft or torque tube of the truck.

The force exerted by the hydraulic jacks may be considered as being applied at a point P (Figures 2 and 14). This point is so located that it is substantially equidistant from the three axes about which the dump body tilts. This insures substantially equal angles of tilt for the dump body, regardless of the direction of tilting.

Trailer vehicle

Figure 16 shows the dump body applied to a trailer. The chassis 149 of the trailer carries the cross beams 7 and 8, and the dump body is mounted thereon. The trailer is adapted to be pulled through a draw beam 150 attached to a truck or tractor, and instead of having a pump and associated mechanism, it is provided with a conduit 151 leading from the hydraulic jack to the truck or tractor. If desired, a large number of trailers may be connected together, and all of the fluid may be supplied from a single power take-off and pump mechanism.

The control lever 37a is placed at any convenient point on the trailer and if desired may be set ahead of time so that the direction of dumping is preselected, and it is only necessary for the driver of the truck or tractor to pull the trailer, or string of trailers, to the desired position and actuate the control valve so as to effect simultaneous dumping.

I have illustrated and described the present preferred form of my invention, but it will be understood that it is not limited to this embodiment, as it may be otherwise embodied within the scope of the following claims.

I claim:

1. A dump truck comprising a chassis having a hollow girder thereon, a body thereabove, a hinge secured to the body, the hinge having a pin adapted to penetrate the girder, and a locking bar mounted for movement axially of the girder for fastening the hinge to the girder.

2. In a dumping vehicle body mounted on a supporting frame, a plurality of gates hinged to the body, individual operating means for each of said gates comprising a bell crank pivoted on the body and free of the frame but adapted for engagement with a member fixed relative to the frame, locking means selectively operable to cause the body to tilt in a predetermined direction, and means actuated by said locking means to preclude operation of certain of said gates.

3. In a construction of the class described, a truck frame, a body located above the truck frame, four vertical socket members mounted on the truck frame in pairs, a rear pair being located near the rear end of the truck frame with one of said socket members thereof at each side of the frame, and a front pair located in front of the rear pair and with one of said members also at each side of the frame, pins insertible in said socket members from above, means pivotally connecting the pins to the underside of the body whereby the body may turn on the pins on axes substantially parallel to the length of the truck frame, locking bars disposed between the said front and rear pairs of socket members, said socket members and pins having aligned transverse openings to receive the ends of the locking bars and manually operable means for simultaneously moving said locking bars lengthwise in either direction to selectively connect the pins and sockets at one side of the frame and disconnect those at the other side, said means for operating said locking bars comprising a shaft mounted lengthwise of the truck frame, cooperating means on the shaft and bars to shift said bars when the shaft is rocked, and means connected to the front end of said shaft for manually rocking the same.

4. In a construction of the class described, a truck frame, a body located above said truck frame and mounted thereon for tilting movement to either side, means for selectively locking the body at one side and releasing it at the other whereby it may be tilted, sides on said body pivotally mounted thereon for outward and downward turning movements about axes at their lower edges, means for latching said sides against movement, and means for automatically unlatching one side upon locking the body at the same side thereof against upward movement and releasing the body at the other side for upward tilting movement.

5. In a construction of the class described, a truck frame, a body mounted on and above said truck frame for selective tilting movement to either side about horizontal axes located one adjacent each side of the truck frame, sides on said body pivotally mounted thereon at their lower edges and lengthwise of the body, means for tilting the body to either side, latching means for holding the sides of the body in closed position, and means for controlling the particular axis about which the body tilts and for simultaneously unlatching the side of the body adjacent the axis about which the body is tilted.

6. In a structure of the class described, a truck frame, front and rear bolsters mounted transversely of the truck frame, a vertical socket member carried at each end of each bolster, vertical pins adapted to be inserted in said socket members, a truck body located above the frame, hinge connections between the pins and the bottom of the truck body, sides on said truck body mounted for pivotal movement about axes at the lower edges of said sides, means for latching said sides against movement, manually operable means for selectively locking the pins associated with the socket members on the rear bolster and for leaving the pins mounted in the socket members of the front bolster free for upward movement and disengagement from their socket members, or for selectively locking the pins at either side of the truck with their respective socket members and freeing the pins at the opposite sides of the truck from their respective socket members, and means for simultaneously unlatching a side of the truck body whenever two of the pins at the same side of the body are locked with their socket members.

7. In a construction of the class described, a truck frame, a body located above the truck frame, two pairs of socket members on said truck frame, one pair near the rear end thereof and the other in front of the first pair, pins insertible into said socket members, means connecting said pins by a hinge joint connection with the bottom of said body, means for locking either the rear pair of pins with their socket members or the pins at either side of the construction with the socket members at the sides of the truck frame, means for tilting the body either to the rear or to either side depending upon which pins are locked with the socket members, sides for said body pivotally mounted thereon for downward and outward turning movement about axes at the lower edges of said sides, means for latching said sides against turning movement, means for operating said latch means to latch the sides against movement with the rear pair of pins locked with their sockets, and means for selectively unlatching either side of the body upon locking the pins to the socket members at the same side of the truck frame.

8. In a vehicle, a pair of bolsters, a tilting body supported thereon, vertical sockets at the ends of said bolsters having sleeves projecting downwardly therethrough, transverse openings in said sleeves, pins pivotally connected to said body, adapted to enter said sleeves, and having transverse openings in alinement with the openings in the sleeves, and locking bars mounted for movement axially of the bolsters through the openings in said pins and sleeves, and means for shifting said locking bars to selectively lock the body for tilting in a predetermined direction.

9. In a tilting vehicle body, front and rear bolsters, a tilting body supported thereon, vertical sockets at the ends of said bolsters, hinge pins pivoted to the body and adapted to enter said sockets, locking bars mounted for movement axially of said bolsters into engagement with said pins, a rock shaft extending longitudinally of the body, and means on said shaft for shifting said locking bars.

10. In a tilting vehicle body, front and rear bolsters, a tilting body supported thereon, vertical sockets at the ends of said bolsters, hinge pins pivoted to the body and adapted to enter said sockets, locking bars mounted for movement axially of said bolsters into engagement with said pins, a rock shaft extending longitudinally of the body, and means on said shaft for shifting said locking bars, discharge gates pivoted to said body, and means actuated by one of said locking bars for locking all the gates except that in the direction toward which the body is free to tilt.

11. In a tilting body, separable means for supporting the body for tilting in a selected direction, means for controlling the direction of tilting, means for shifting said tilting direction control means, discharge gates pivoted to the body, and means operated by said last-mentioned means for positively locking said gates.

12. In a vehicle, a frame, a body mounted thereon for tilting movement, discharge gates pivoted to said body, means for selectively locking said gates against opening, operating means for each of said gates including a bell crank pivoted to the body, a link connecting one end of the crank to its gate, the other end of the crank being free, a cam surface on said frame, and a cam roller on said crank cooperating therewith, whereby, on lowering of the body from tilted position with a gate open, engagement of the roller with the cam forces the gate to closed position.

13. In a vehicle, a frame, a body mounted thereon for tilting movement, means for controlling the direction in which the body is free to tilt upon the application of an upward thrust thereto, discharge gates pivoted to the body, means operated by said tilting direction control means for selectively locking the gates, and operating mechanism for each of said gates including a bell crank pivoted to the body, a link connecting one end of the bell crank to its gate, the other end of the bell crank being free, and means fixed relative to the frame for cooperating with the free end of said bell crank.

14. Operating mechanism for a downfolding gate of a body tiltably mounted on a vehicle frame, comprising means projecting downwardly from the body, a bell crank entirely beneath the body pivoted to said means, a link connected to the gate eccentrically of the axis of rotation of the gate and pivoted to the crank, and a stationary cam surface in the path traversed by the crank on tilting of the body.

15. Operating mechanism for a downfolding gate of a body tiltably mounted on a vehicle frame, comprising means projecting downwardly from the body, a bell crank entirely beneath the body pivoted to said means, a link connected to the gate eccentrically of the axis of rotation of the gate and pivoted to the crank, a cam surface and cam engaging means cooperating therewith, one mounted on the crank and the other on means secured to the frame, for causing the crank to operate the gate in accordance with the movement of said body.

16. In a vehicle, a frame, transverse bolsters mounted thereon, a body supported above the bolsters for tilting movement, pins projecting downwardly from said body into said bolsters, locking bars movable axially of said bolsters to engage said pins, discharge gates pivoted to the body adjacent their lower edges for downward and outward movement, and means including a transversely slidable bar operated by movement of said locking bars for selectively locking all said gates except that in the direction of dumping, and means engaging said one of said locking bars and said transversely slidable bar for effecting simultaneous movement thereof.

17. In a tilting body and support therefor adapted to be mounted on the chassis of a vehicle, a pair of cross members, hinges on the members for tiltably supporting the body, gates pivoted on the body, bars slidable along said members for locking said hinges, means movably mounted on the body for locking said gates, and common actuating means for the hinge-locking bars and the gate locking means.

18. In a tilting body and support therefor, a plurality of separable hinges supporting the body for tilting, gates pivoted to the body, operating mechanism for a gate including a bell crank pivoted on the body and connected to the gate, and stationary means for actuating the crank on lowering of the body from tilted position, means for locking the hinges against separation, means for operating the hinge-locking means, and means operated by said operating means for locking said gate.

19. In a tilting body and support therefor, a plurality of separable hinges supporting the body for tilting, gates pivoted to the body, operating mechanism for a gate including a bell crank pivoted on the body and connected to the gate, and stationary means for actuating the crank on lowering of the body from tilted position, means for locking the hinges against separation, means for operating the hinge-locking means, and means operated by said operating means for obstructing movement of said crank to lock the gate.

20. In a vehicle, a body, separable means for supporting said body for tilting movement in a predetermined direction, a rocking shaft extending longitudinally of the body, locking bars for securing said separable means together, means on said shaft for actuating said bars, and means for securing one of said locking bars against movement when the body is tilted.

21. In a vehicle, a frame, a body supported thereabove, four sockets supported on said frame in front and rear pairs, one socket of each pair being disposed on each side of the frame, transverse openings in said sockets, pins pivotally connected to the body and adapted to enter said sockets, transverse openings in said pins, means for controlling the direction of body tilt including members cooperating with said openings, and a rock shaft extending longitudinally of the body for actuating said tilting direction control means.

22. In a vehicle, a frame, hollow girders extending across the frame, a body mounted for tilting movement thereon, bars supported by said girders for axial movement to lock the body for tilting in a predetermined direction on the application of an upward thrust thereto, a rock shaft extending transversely of said girders, and means on said shaft for shifting said bars.

23. A dump truck comprising a chassis, a dump body mounted thereon and having gates, means for selectively locking one side of the body to the chassis to determine the direction of dumping, means for unlocking the gate on the selected side of the body and locking the other gate or gates, said last-mentioned means being actuated by the first-mentioned means.

24. In a dumping vehicle body adapted to tilt in a plurality of directions, hinged gates on said body and operating means therefor, means for selectively locking an edge of the body against elevation to control the direction in which the body is to dump, and means actuated by the second-mentioned means for locking all the gates except that in the direction of dumping.

25. In a three-way dump body having hinged gates, the combination with means for selectively locking an edge of the body against elevation to control the direction of dumping to either side or to one end thereof, of means actuated by said means for precluding operation of all of said gates except that in the direction of dumping.

26. In a vericle body, discharge gates pivoted thereto, operating mechanism for each gate and means for selectively engaging said operating mechanisms to lock one of said gates, comprising a bar mounted below said body for transverse sliding movement.

27. In a vehicle, a frame, a body mounted thereon for tilting movement, means for controlling the direction of body tilt, discharge gates pivoted to the body, means for locking said gates operated by said tilting direction control means, means for normally holding the gates closed, and means for withdrawing the holding means to open one of said gates fully, said withdrawing means being operated automatically by movement of the body shortly after the commencement of a tilting operation.

28. In a vehicle, a frame, hollow cross girders thereon, a body mounted on the girders for tilting to either side or to the rear, a plurality of sockets on said girders, pins projecting downwardly from said body into said sockets, the pins at the rear of the body being universally jointed thereto, and means for selectively locking said pins to said sockets in pairs to control the direction in which the body is free to tilt upon the application of an upward thrust thereto, said means including longitudinally slidable bars supported by said girders adapted to move into and out of engagement with said pins.

29. In a vehicle, a frame, a body mounted thereabove for tilting movement, discharge gates pivoted to the body, means for selectively locking an edge of the body to the frame, means operated thereby for selectively locking said gates against opening, and mechanism for operating each of said gates on tilting movement of the body in a predetermined direction, including a bell crank pivoted to the body.

30. In a vehicle, a frame, bolsters on the frame and a body supported on the bolsters for tilting movement, separable hinge members on said body adapted to engage said bolsters, bars slidable on the bolsters for locking the hinges, and means for controlling the direction of body tilt including a rock shaft extending transversely of said bolsters, and means on the shaft for actuating the bars.

31. In a vehicle, a frame, a body tiltably mounted thereon, side gates pivoted to the body adjacent their lower edges for downward and outward movement, a bar mounted for sliding movement transversely of the frame for locking said gates, and a lever pivoted to the frame for operating said bar.

32. In a dump car in combintion, an underframe, a body tiltably mounted on the underframe, a side door for the body hinged adjacent the floor of the body and a door operating mechanism, said mechanism including a member pivotally mounted on the body so as to be rotatable in the vertical plane of the body when the body is in tilting position, said member having one end adapted to engage with the underframe and the other end connected to the adjacent door below the floor of the body.

CAMILLE P. GALANOT.

CERTIFICATE OF CORRECTION.

Patent No. 2,168,298. August 1, 1939.

CAMILLE P. GALANOT.

It is hereby certified that error appears in the printed specification of the above numbered patent requiring correction as follows: Page 6, second column, line 48, after the article "the" insert load; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.